April 15, 1969     L. K. EDWARDS     3,438,337
HIGH-SPEED GROUND TRANSPORTATION SYSTEM
Original Filed July 21, 1965     Sheet 1 of 2
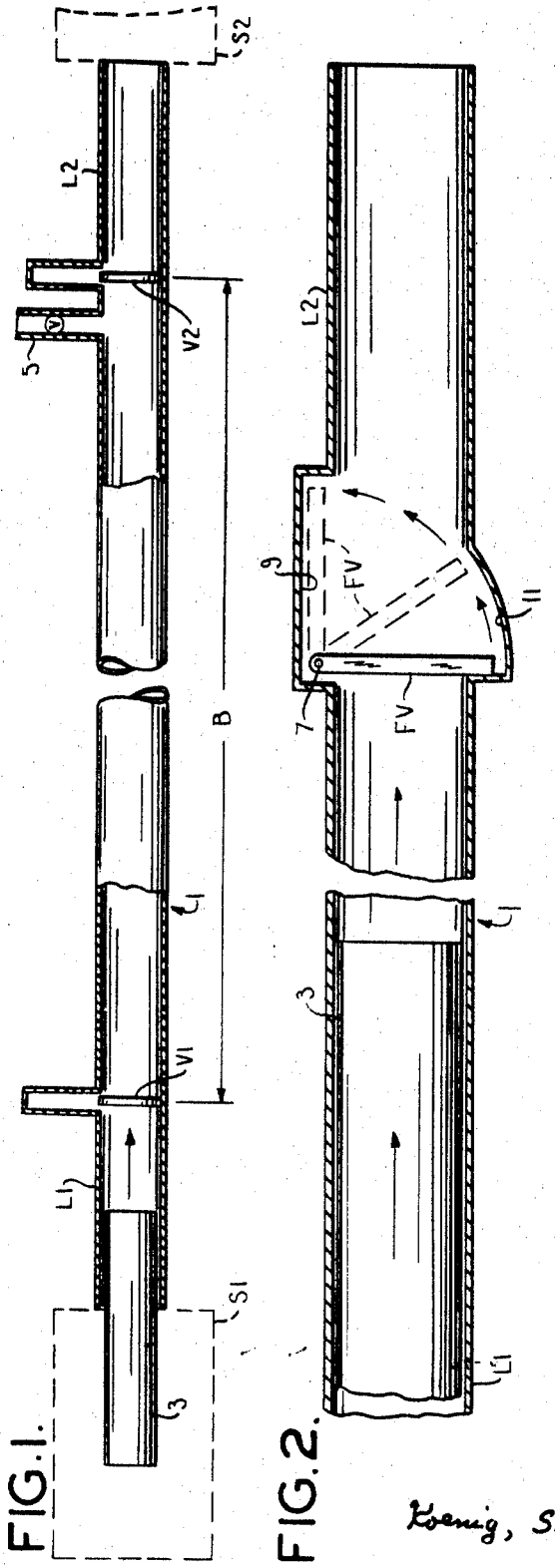
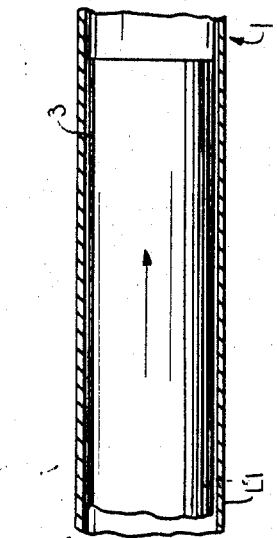
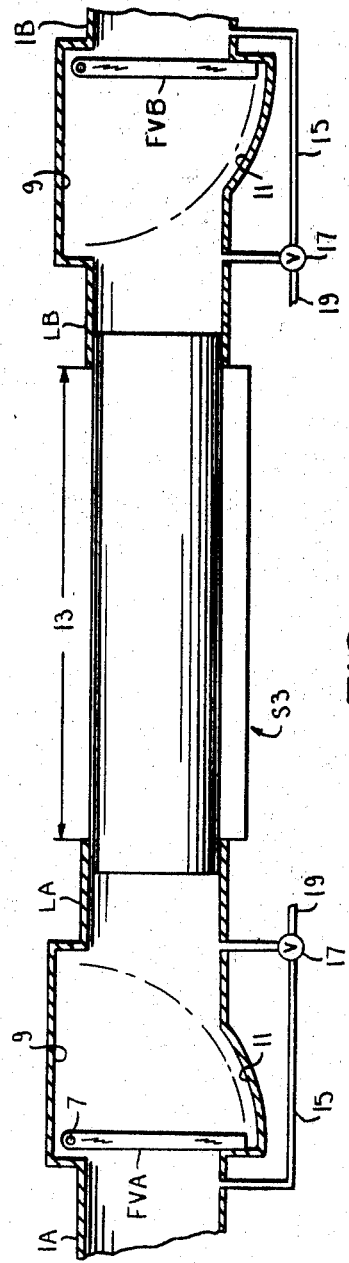
Lawrence K. Edwards,
Inventor.
Koenig, Senniger, Powers and Leavitt,
Attorneys.

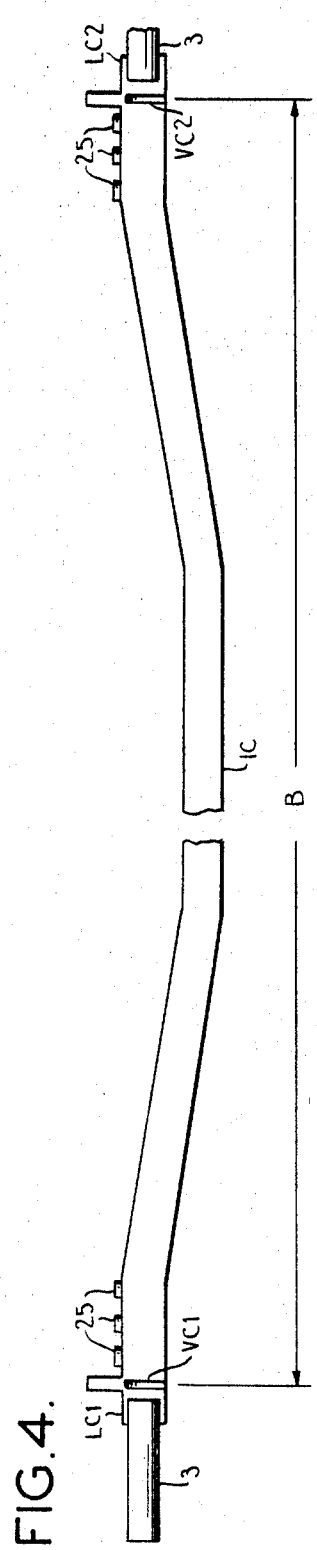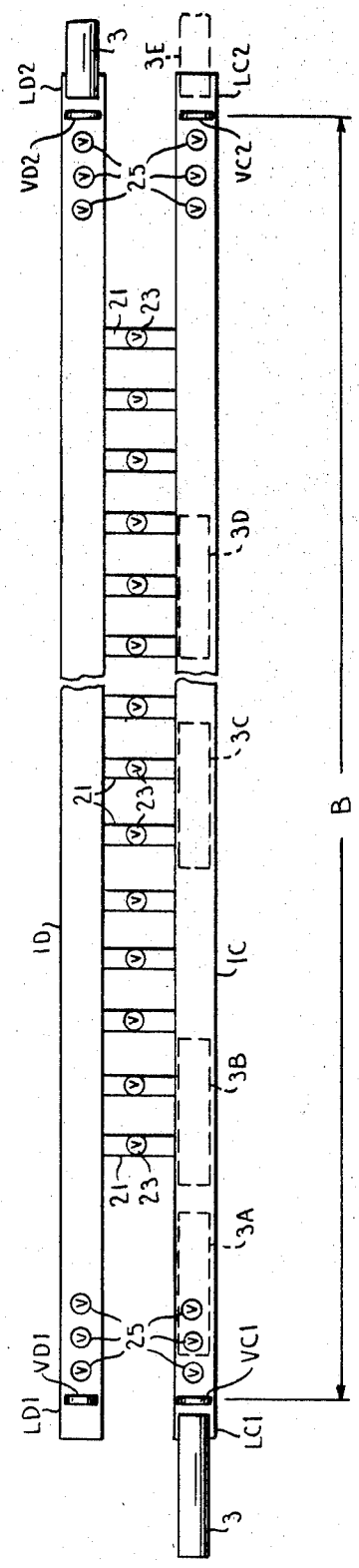
FIG.4.
FIG.5.

United States Patent Office 3,438,337
Patented Apr. 15, 1969

3,438,337
HIGH-SPEED GROUND TRANSPORTATION
SYSTEM
Lawrence K. Edwards, 301 Santa Rita Ave.,
Palo Alto, Calif. 94301
Continuation of application Ser. No. 473,724, July 21,
1965. This application Apr. 10, 1968, Ser. No. 720,408
Int. Cl. B61b *13/10;* B65g *51/04*
U.S. Cl. 104—156                                         20 Claims

ABSTRACT OF THE DISCLOSURE

A high-speed ground transportation system comprises a duct through which a vehicle is adapted for propulsion as a free piston. Valves are provided adjacent the ends of the duct, with air locks open to the atmosphere outward of the valves. The section of the duct between the valves is pre-evacuated. With the vehicle in one lock, on opening the respective valve, atmospheric air pressure forces the vehicle into said section. After the vehicle has passed the valve, the latter is closed to trap a slug of air between the valve and the rear of the vehicle. This trapped slug of air expands to apply propulsion force to the rear of the vehicle, with attenuation of the air behind the vehicle to restore vacuum in the duct and with compression of air ahead of the vehicle. The valve at the other end of said section opens when the pressure ahead of the vehicle generally equals atmospheric pressure and, after the vehicle stops in the other air lock, this valve is closed.

This application is a continuation of my earlier filed application Ser. No. 473,724, filed July 21, 1965, now abandoned.

This invention relates to high-speed ground transportation systems, and more particularly to pneumatic systems of this class.

The invention is concerned with systems for high-speed intercity mass transportation as, for example, between New York, N.Y. and Philadelphia, Pa., and for high-speed intra-urban mass transportation, as are presently needed and will be even more urgently needed in the near future. It contemplates, for example, trains of high passenger capacity traveling at speeds up to 700 m.p.h.

The invention is particularly concerned with a high-speed ground transportation system of the type in which a vehicle (which may consist of a train of detachably-coupled wheeled cars) is propelled as a free piston through a tube or duct by differential pressure of air between the front and rear of the vehicle, such as is disclosed in my copending United States patent application Ser. No. 473,726, filed July 21, 1965, entitled High-Speed Ground Transportation System, issued as U.S. Patent 3,404,638, Oct. 8, 1968.

In my said copending United States patent application, I have disclosed a system in which differential air pressure between the front and rear of the vehicle is attained by the provision of pumping stations at intervals along the route equipped with diesel-engine or electric-motor-driven pumps for evacuation of air from the duct ahead of the vehicle, propulsive air at atmospheric or higher pressure being delivered to the duct rearward of the vehicle.

Among the several objects of this invention may be noted the provision of a pneumatic high-speed ground transportation system of this same general class and a method of operating the system which enables utilization of the pressure of atmospheric air as the principal source of power for operation of the system, thereby reducing the necessity for pumping equipment to a minimum; the provision of a system such as described having an air lock duct terminal arrangement permitting starting and stopping of the vehicle and entrance and exit of passengers without being exposed to reduced-pressure conditions generally prevailing in the duct; the provision of such a system with an improved air lock valve; the provision of such a system with an intermediate station arrangement; and the provision of a double-track system and method of operating the same such as described. Other objects and features will be in part apparent and in part pointed out hereinafter.

The invention accordingly comprises the constructions and methods hereinafter described, the scope of the invention being indicated in the following claims.

In the accompanying drawings, in which several of various possible embodiments of the invention are illustrated, FIG. 1 is a diagrammatic view, with parts broken away and shown in section, illustrating a basic system of this invention;

FIG. 2 is a fragmentary view, on a larger scale than FIG. 1, illustrating an improved gate valve which may be used in the system;

FIG. 3 is a view illustrating an arrangement of this invention for an intermediate station; and FIGS. 4 and 5 are views illustrating a double-track system of this invention.

Corresponding reference characters indicate corresponding parts throughout the several views of the drawings.

Referring first to FIG. 1 of the drawings, which illustrates the basic principles of the invention, there is indicated at 1 a duct which extends between stations S1 and S2 of the route of the transportation system. At 3 is indicated a vehicle which is adapted for propulsion as a free piston through the duct by differential pressure of air between the front and rear of the vehicle. Adjacent the end of the duct at station S1 there is a gate valve V1. Adjacent the end of the duct at station S2 there is a gate valve V2. These gate valves, when closed, block off a section B of the duct from valve to valve. Provision is made as indicated at 5 for evacuating section B (valves V1 and V2 being closed) down to low pressure (of the order of one p.es.i., for example). The duct has terminal or end portions outward of valves V1 and V2 constituting air locks L1 and L2. These are open at their outer ends to the atmosphere.

As shown in FIG. 1, both valves V1 and V2 are closed. Section B has been evacuated down to low pressure (of the order of one p.s.i., for example). Vehicle 3 occupies a position with one end thereof in the air lock L1, its other end projecting out of the lock and being exposed to atmospheric pressure. The end face of the vehicle inside the air lock L1 facing valve V1 is spaced from valve V1. These are the conditions at the start of a trip of vehicle 3 from station S1 to station S2. This trip is initiated by opening valve V1.

As a result of opening valve V1, the forward end of the vehicle in the air lock L1 is exposed to the low pressure of the duct. Since the rearward end of the vehicle is exposed to atmospheric pressure, the vehicle is propelled through the air lock L1, past the valve V1, and into section B, accelerating as it travels. Valve V1 is maintained open for an interval after the rearward end of the vehicle has passed thereby, to permit atmospheric air to enter section B behind the vehicle via air lock L1. Then, after the vehicle has progressed past the valve V1 for some distance, depending on the length of section B and the weight of the vehicle, valve V1 is closed. The effect of this is to trap a slug of atmospheric air (at atmospheric pressure of some 14.7 p.s.i.) between valve V1 and the rear of the vehicle. This completes the first stage of the trip.

The slug of air at atmospheric pressure entrapped in section B between closed valve V1 and the rearward end of the vehicle expands and exerts force against the rearward end of the vehicle of much higher magnitude than the force exerted by low pressure air in section B ahead of the vehicle to continue positive propulsion of the vehicle as a free piston through the duct, the vehicle continuing to accelerate though at a diminishing rate as the slug of air expands. This positive propulsion of the vehicle by the expansion of the entrapped slug of air continues until the pressure of air in section B behind the vehicle and the pressure of air in section B ahead of the vehicle are equalized. This completes the second stage of the trip. By this time, the vehicle is traveling at high speed (the order of 300 m.p.h. due solely to the pneumatics), and has attained considerable kinetic energy sufficient to enable it to coast, without any necessity for additional power, to station S2.

Following the termination of the second stage of the trip, as above described, the vehicle continues its travel as a free piston through the duct, gradually decelerating as it proceeds. As the vehicle moves forward as a free piston, it compresses the air in section B ahead of the vehicle, and expands the space in section B rearward of the vehicle. Deceleration of the vehicle occurs because of exchange of its kinetic energy into force for compression of the air ahead of the vehicle and into friction losses, taking place at a progressively increasing rate.

Compression of air ahead of the vehicle occurs until it is compressed to a pressure of the atmospheric air, which occurs as the vehicle approaches valve V2. At this stage of the trip, valve V2 is opened to permit exit of the decelerating vehicle (and air) from section B. The vehicle passes into and partly through the air lock L2, coming to a stop with its outer end projecting out of the air lock L2 and its inner end within the air lock L2 but spaced from the valve V2. The latter is closed as soon as the vehicle passes thereby.

This terminates the trip from station S1 to S2, the vehicle coming to a stop projecting out from air lock L2 as described in position for starting a trip from station S2 back to station S1. As above described, valves V2 and V1 are both closed. Section B, between valves V2 and V1 has been evacuated to nearly the original pressure level as an inherent result of the expansion effect of the vehicle traveling in the duct toward station S2 after the closure of valve V1. Means for accomplishing the final small increment of pressure reduction are discussed in the next paragraph. Now, by opening valve V2, the vehicle may be started on the trip from station S2 back to station S1, the operating procedure for the trip being the same as above described in reverse. The vehicle terminates the trip back in the position shown in FIG. 1, and is then ready for another trip from station S1 to station S2, back again from S2 to S1, and so on.

It will be seen that, after the initial evacuation of section B, the earth's atmosphere is utilized as an infinite reservoir of pressure air for derivation of nearly all of the energy for propelling the vehicle through the duct. With the duct evacuated down to a low pressure of the order of one p.s.i., it is possible to attain vehicle speeds in excess of 600 m.p.h. The energy exchange between the atmospheric air and the vehicle can be made nearly 100% efficient, so that the majority of the power required for propulsion of the vehicle may be derived free from the atmosphere. Some power must, of course, be supplied other than from the atmospheric source initially to evacuate the duct and from time-to-time to make up for energy losses due to friction (e.g., rolling friction of the wheeled vehicle and friction of air in moving in the duct) and for incidental air leakage into the duct, but this is minor in relation to the power obtained from the atmosphere and may be supplied by a relatively low-power pumping station or stations, which may operate throughout the time of a single trip or even extend their operation until time for the next vehicle trip.

FIG. 2 illustrates a special type of gate valve of this invention which is particularly suitable for use in a system such as above described. As shown therein, the valve, which is designated FV, is a flapper valve pivoted as indicated at 7 to swing out toward the adjacent end of the duct 1 in response to build-up of pressure in section B of the duct as the vehicle approaches the valve. The duct 1, as shown, has a recess 9 at the top for accommodating the valve when swung fully open for passage of the vehicle. The pivot 7 is in this recess. The duct also has an arcuate recess 11 at the bottom into which the lower end of the valve extends, this recess being curved on an arc centered in the axis of pivot 7. The arrangement is such that air pressure which builds up in the duct as the vehicle approaches the valve tends to swing the valve open. However, due to the provision of the bottom recess 11 into which the lower end of the valve extends, the valve must travel through a predetermined arc before it permits air to escape from the duct, this arc being referred to as the "pretravel" of the valve. The effect of this arrangement requiring pretravel of the valve before air may escape from the duct past the valve is that a finite rate of angular motion is imparted to the valve before the air may escape, thereby aiding in assuring that the valve will open fully before the vehicle arrives at the valve to insure that the valve will be wholly clear of the vehicle. The valve must, of course, be externally powered to open it for starting a vehicle on a trip through the duct from the air lock adjacent the valve. However, the arrangement in which the valve is biased to open by pressure build-up in the duct as the vehicle approaches the valve is useful to insure opening of the valve to clear a vehicle for exit from section B into the air lock, even in the event of a power failure.

FIG. 3 illustrates an arrangement which may be used at an intermediate station S3 as distinguished from terminal stations such as indicated at S1 and S2 in FIG. 1. As shown in FIG. 3, the duct is in effect divided into two separate reaches 1A and 1B with a gap 13 therebetween at the intermediate station. The reach 1A terminates at an air lock LA and the reach 1B terminates at an air lock LB, the gap being between these locks. In reach 1A adjacent air lock LA is a valve FVA, and in reach 1B adjacent air lock LB is a valve FVB. These valves may be the same as valve FV previously described. The length of the gap 13 is so related to the length of the vehicle that the vehicle may be stopped at the intermediae station with one end in lock LA and its other end in lock LB.

An air by-pass 15 having a valve 17 therein may be provided around each valve FVA and FVB interconnecting the duct and the respective air lock, with an ambient air inlet 19 also controlled by valve 17, as a convenient means for bringing the vehicle into position with its ends in the air locks. Each valve 17 may be set to evacuate the respective air lock by connecting it to the respective duct inward of the respective valve FVA or FVB, or to admit ambient air to the air lock. Thus, for example, by setting the right-hand valve 17 to evacuate air lock LB and by setting the left-hand valve 17 to admit ambient air to lock LA, the vehicle may be moved toward the right, and at slow speed consistent with the rate of air flow through the valves 17. Similarly, by setting the left-hand valve 17 to evacuate air lock LA and by setting the right-hand valve 17 to admit ambient air to lock LB, the vehicle may be moved toward the left.

With regard to starting up the vehicle from the intermediate station S3 for a trip through reach 1A of the duct, valve FVA is opened, whereupon air pressure in air lock LB (brought in either via the left-hand valve 17 or a separate valve, or even by providing for a finite leakage of air around the right end of the vehicle into lock LB) propels the vehicle to the left to the point where the rearward end of the vehicle is exposed to the ambient atmosphere in station S3 and then propulsion of the vehicle continues in the same manner as described in connection with FIG. 1. Similarly, in starting up the vehicle for a trip through reach 1B of the duct, valve FVB is opened, and air pressure in lock LA (brought in either via the right-hand valve 17 or a separate valve or by providing for a definite leakage of air around the left end of the vehicle into lock LA) propels the vehicle to the right.

FIGS. 4 and 5 illustrate a double-track system of this invention which comprises a pair of ducts, designated 1C and 1D, located side-by-side for travel of vehicles in opposite directions on the same route. The two ducts are cross-connected at suitably spaced intervals along their length by cross-ducts 21, each of which has a valve therein as indicated at 23. There are air locks LC1 and LC2 at the ends of duct LC and air locks LD1 and LD2 at the ends of duct 1C (corresponding to air locks L1 and L2 of duct 1 of FIG. 1). There are main valves VC1 and VC2 adjacent the ends of duct 1C and main valves VD1 and VD2 adjacent the ends of duct 1D (corresponding to the valves V1 and V2 adjacent the ends of duct 1 of FIG. 1). Additionally, each duct 1C and 1D has a series of auxiliary valves each designated 25 spaced at intervals along the length of the duct immediately inward of each main valve at both ends of the duct. Each of these valves 25 is in communication with the ambient atmosphere and is adapted, when opened, to admit atmospheric air to the respective end of the section B of the respective duct.

The mode of operation of the FIG. 5 double-track system for travel of vehicle 3 through duct 1C from air lock LC1 to LC2 will now be described, and it will be apparent from this how the system is operated for travel of a vehicle through duct 1D. As shown in FIG. 5, a vehicle 3 has one end entered in air lock LC1 at the left end of duct 1C. Initially, main valves VC1, VC2, VD1 and VD2 and valves 25 are all closed. All of cross-connection valves 23 are open. Sections B of both ducts 1C and 1D have been evacuated down to low pressure (of the order of one p.s.i., for example). The trip of the vehicle through duct 1C is initiated by opening valve VC1.

As a result of opening valve VC1, the vehicle is propelled through the air lock LC1, past the valve VC1, and into section B of duct 1C, in the same manner as above described in connection with FIG. 1. Valve VC1 is maintained open for an interval after the rearward end of the vehicle has passed thereby, to permit atmospheric air to enter section B of duct 1C behind the vehicle via air lock LC1. Also, valves 25 at the left end of duct 1C are opened in succession as the rearward end of the vehicle passes thereby to admit additional atmospheric air to section B of duct 1C behind the vehicle. Thus, as regards position 3A shown for the vehicle in FIG. 5, the valve 25 at the left end of the series of valves 25 for the left end of section B of duct 1C would be open, and the remainder of these valves 25 would be closed, but about to open as the rearward end of the vehicle passes thereby. After the vehicle has progressed past the last of the valves 25 at the left end of duct 1C to a position such as indicated at 3B in FIG. 5, the valve VC1 and the valves 25 at left end of duct 1C are closed, trapping a slug of atmospheric air (at atmospheric pressure) in duct 1C between valve VC1 and the rear of the vehicle. This completes the first stage of the trip.

The slug of air at atmospheric pressure entrapped in duct 1C between valve VC1 and the rearward end of the vehicle expands and propels the vehicle forward, the vehicle continuing to accelerate though at a diminishing rate as the slug of air expands. As the vehicle passes the cross-connections 21, the valves 23 in these cross-connections are progressively closed, to retain the expanding slug of air in duct 1C. The positive propulsion of the vehicle by the expansion of the entrapped slug of air continues until the pressure of air in duct 1C ahead of the vehicle equals the pressure of air in duct 1C behind the vehicle. This occurs at a position of the vehicle such as indicated at 3C in FIG. 5. This completes the second stage of the trip, and by this time the vehicle is traveling at high speed and has attained sufficient kinetic energy to coast all the way to air lock LC2.

At the completion of the second stage of the trip, as above described, all the cross-connection valves 23 which were closed as the vehicle passed thereby are opened (those ahead of the vehicle already being open). The vehicle continues its travel as a free piston through duct 1C, air ahead of the vehicle passing from duct 1C via the cross-connections 21 ahead of the vehicle (the valves 23 of which are open) to duct 1D and thence via duct 1D and the cross-connections 21 rearward of the vehicle (the valves 23 of which are open) back to duct 1C behind the vehicle. The vehicle decelerates gradually as it proceeds due to air circulation drag and rolling friction. This phase of operation continues until the vehicle reaches a position such as indicated at 3D in FIG. 5, at which point the cross-connection valves 23 ahead of the vehicle are closed.

When the cross-connection valves 23 ahead of the vehicle are closed, the vehicle starts compressing air ahead of the vehicle, causing the vehicle to decelerate at an increasing rate. The compression of the air ahead of the vehicle continues as the vehicle travels forward until the pressure of the air reaches atmospheric pressure. At this point the valves 25 at the right end of duct 1D are opened, and valve VC2 is opened to permit exit of the decelerating vehicle from section B of duct 1C into the air lock LC2. The vehicle passes into and partly through the air lock LC2, coming to a stop as indicated at 3E with its outer end projecting out of the lock and its inner end in the lock but spaced from valve VC2. Valves 25 at the right end of the duct 1C are progressively closed as the vehicle passes thereby and gate valve VC2 is closed as the vehicle passes thereby, to prevent loss of vacuum drawn in ducts 1C and 1D by the vehicle.

This terminates the trip of the vehicle through duct 1C from air lock LC1 to air lock LC2, the vehicle coming to a stop at 3E projecting out of air lock LC2 in position for starting a trip back through duct 1C to air lock LC1 by a reversal of the procedure. Propulsion of a vehicle back and forth through duct 1D is effected in a similar manner. It will be observed that, as regards travel of the vehicle through duct 1C, duct 1D serves as an auxiliary duct, in conjunction with the valved cross-connections 21, for passage of air from ahead of the vehicle to behind the vehicle during the intermediate coasting phase of the trip (after equalization of the pressure ahead of and the pressure behind the vehicle). The addition of valves 25 is advantageous for more rapidly and efficiently admitting air to the duct behind the vehicle at the start of a trip for accelerating the vehicle and for more rapidly and efficiently pushing air out of the duct ahead of the vehicle at the conclusion of a trip when the pressure in the duct ahead of the vehicle has reached atmospheric pressure. Neglecting losses due to air circulation drag and rolling friction, the momentum of the vehicle is sufficient to eject the same amount of air in the last phase of the operation as was taken in during the initial phase of the operation, and each succeeding trip of the vehicle, apart from these losses, is a relatively free trip, i.e., it requires no additional power except that which may be needed to make up for said losses.

It will be understood that the principles of the double-track system with the valved cross-connections and the gate or main valves at the ends of the duct may be utilized in a single-track system, as to which the place of the second vehicle duct would be taken by a second or auxiliary duct cross-connected to a single vehicle duct.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A high-speed ground transportation system comprising a duct, a vehicle adapted for propulsion as a free piston through the duct by differential air pressure on the ends of the vehicle, a valve for the duct adjacent one end of the duct, a valve for the duct adjacent the other end of the duct, said valves adapted when closed to block off a section of the duct from valve to valve, said section being evacuated prior to entry of the vehicle therein, the duct having end portions outward of the valves constituting air locks open at their outer ends to the atmosphere, the vehicle being adapted to occupy a position within either of said air locks with one end thereof toward the respective valve and its other end exposed to pressure of atmospheric air.

2. A system as set forth in claim 1 wherein each valve is a flapper valve pivoted to swing from a closed position extending across the duct to an open position clearing the duct for passage of a vehicle from said section into the respective air lock, said valve swinging from closed to open position outward in the direction toward the respective air lock responsive to build-up of pressure in the duct by a vehicle approaching the valve.

3. A system as set forth in claim 2 wherein each valve and the duct are formed so that the valve maintains the duct blocked until the valve has swung in opening direction through a predetermined arc.

4. A system as set forth in claim 3 wherein the duct has a recess at the top thereof, the valve being pivoted in this recess, and an arcuate recess at the bottom curved on an arc centered in the axis of the pivot for the valve, the lower end of the valve extending into said bottom recess.

5. A system as set forth in claim 1 wherein the duct is divided into separate reaches with a gap therebetween at an intermediate station, each reach having a valve therein adjacent its end at the gap, the end portions of the reaches between these valves and the gap constituting air locks open at their outer ends to the atmosphere.

6. A system as set forth in claim 5 having a valved air by-pass around one of said valves at the intermediate station and a valved air by-pass around the other of said valves.

7. A system as set forth in claim 1 having a series of auxiliary valves spaced at intervals along the length of the duct immediately inward of each of said first-mentioned valves, said auxiliary valves communicating with the atmosphere.

8. A system as set forth in claim 1 having a second duct paralleling said first-mentioned duct, and valved cross-connections between said ducts.

9. A system as set forth in claim 8 wherein said second duct is a vehicle duct adapted for propulsion of a vehicle as a free piston therethrough, said second duct having valves adjacent the ends thereof and end portions outward of these valves constituting air locks open at their outer ends to the atmosphere.

10. A system as set forth in claim 9 wherein each duct has a series of auxiliary valves spaced at intervals along its length immediately inward of each of the valves adjacent the ends of the duct, said auxiliary valves communicating with the atmosphere.

11. The method of operating a high-speed ground transportation system in which a vehicle is propelled as a free piston through a duct, the duct having valves adjacent its ends adapted when closed to block off a section of the duct from valve to valve, and end portions outward of the valves constituting air locks, comprising starting with the vehicle in one air lock, both valves closed, and said section evacuated, opening the valve for said one air lock for propulsion of the vehicle through said lock and past said valve, closing said valve after the rearward end of the vehicle has passed thereby to trap a slug of atmospheric air in said section between said valve and the rearward end of the vehicle, said slug of air expanding to continue to propel the vehicle through the duct until the pressure of air rearward and ahead of the vehicle is equalized, the vehicle then coasting under the kinetic energy built up therein, and pushing forward air ahead of the vehicle, and opening the other valve when the pressure of air ahead of the vehicle generally equals atmospheric pressure for exit of the vehicle from said section, the vehicle passing into and being stopped in the other air lock and the other valve closing behind the vehicle.

12. The method of operating a high-speed ground transportation system in which a vehicle is propelled as a free piston through a duct, the duct having first and second main valves adjacent its ends adapted when closed to block off a section of the duct between the main valves, end portions outward of the valves constituting first and second air locks, and a first and a second series of auxiliary valves spaced at intervals along the length of the duct immediately inward of each of the main valves communicating with the atmosphere, comprising starting with the vehicle in the first air lock, all the valves closed, and said section evacuated, opening the first main valve for propulsion of the vehicle through said first lock and past said first main valve, successively opening the auxiliary valves of said first series as the vehicle passes thereby, closing said first main valve and the auxiliary valves of said first series after the vehicle has passed the last of the auxiliary valves of the first series to trap a slug of atmospheric air in said section behind the vehicle, said slug of air expanding to continue to propel the vehicle through the duct until the pressure of air rearward and ahead of the vehicle are equalized, the vehicle then coasting under the kinetic energy built up therein, and pushing forward air ahead of the vehicle, and opening the second main valve and the auxiliary valves of the second series when the pressure of air ahead of the vehicle generally equals atmospheric pressure for exit of the vehicle and air from said section, the vehicle passing into and being stopped in the second air lock, and the auxiliary valves of the second series and the second main valve being closed as the vehicle passes thereby.

13. The method of operating a high-speed ground transportation system in which a vehicle is propelled as a free piston through a first duct, said first duct having first and second main valves adjacent its ends adapted when closed to block off a section of the first duct between the main valves, end portions outward of the main valves constituting first and second air locks, a second duct alongside the first duct and cross connections between the ducts spaced at intervals therealong and having cross-connecting valves therein, comprising starting with the vehicle in the first air lock, both main valves closed, said cross-connecting valves open, and both ducts evacuated, opening the first main valve for propulsion of the vehicle through said first air lock and past said first main valve, closing the first main valve after the vehicle has passed thereby to trap a slug of atmospheric air behind the train in said section, progressively closing the cross-connecting valves as the vehicle passes thereby to hold the slug of air trapped in said section, said slug of air expanding to continue to propel the vehicle through the first duct until the pressure of air rearward and ahead of the vehicle are equalized, opening the cross-connecting valves behind the vehicle for passage of air from ahead of the vehicle through the cross connections ahead of the vehicle into the second duct and from the second duct through the cross connections behind the vehicle into the first duct, the vehicle coasting under the kinetic energy built up therein, and pushing forward air ahead of the vehicle, closing the cross-connecting valves ahead of the vehicle for compression of the air ahead of the vehicle and, when the pressure of air ahead of the vehicle generally equals atmospheric pressure, opening the second main valve for exit of the vehicle and air from said section, the vehicle passing into and being stopped in the second air lock, and the cross-connecting valves being opened and the second main valve being closed behind the vehicle.

14. The method of operating a high-speed ground transportation system in which a vehicle is propelled as a free piston through a first duct, said first duct having first and second main valves adjacent its ends adapted when closed to block off a section of the first duct between the main valves, end portions outward of the main valves constituting first and second air locks, a first and a second series of auxiliary valves spaced at intervals along the length of the first duct immediately inward of the main valves communicating with the atmosphere, a second duct alongside the first duct and cross connections between the ducts spaced at intervals therealong and having cross-connecting valves therein, comprising starting with the vehicle in the first air lock, both main valves and all the auxiliary valves closed, said cross-connecting valves open, and both ducts evacuated, opening the first main valve for propulsion of the vehicle through said first air lock and past said first main valve, successively opening the auxiliary valves of the first series as the vehicle passes thereby, closing the first main valve and the auxiliary valves of the first series after the vehicle has passed the last of the auxiliary valves of the first series to trap a slug of atmospheric air behind the train in said section, progressively closing the cross-connecting valves as the vehicle passes thereby to hold the slug of air trapped in said section, said slug of air expanding to continue to propel the vehicle through the first duct until the pressure of air rearward and ahead of the vehicle are equalized, opening the cross-connecting valves behind the vehicle for passage of air from ahead of the vehicle through the cross connections ahead of the vehicle into the second duct and from the second duct through the cross connections behind the vehicle into the first duct, the vehicle coasting under the kinetic energy built up therein, and pushing forward air ahead of the vehicle, closing the cross-connecting valves ahead of the vehicle for compression of the air ahead of the vehicle and, when the pressure of air ahead of the vehicle generally equals atmospheric pressure, opening the second main valve and the auxiliary valves of the second series for exit of the vehicle and air from said section, the vehicle passing into and being stopped in the second air lock, and the cross-connecting valves being opened and the auxiliary valves of the second series and the second main valve being closed behind the vehicle.

15. A high-speed ground transportation system comprising a duct having a valve adjacent one end thereof and an end portion outward of the valve constituting an air lock open at its outer end to the atmosphere, said valve defining one end of an evacuated section of the duct, said valve being a flapper valve pivoted to swing from a closed position extending across the duct to an open position clearing the duct for passage of a vehicle from said section into the respective air lock, said valve swinging from closed to open position outward in the direction toward the respective air lock responsive to build-up of pressure in the duct by a vehicle approaching the valve, the valve and the duct being formed so that the valve maintains the duct blocked until the valve has swung in opening direction through a predetermined arc.

16. A system as set forth in claim 15 wherein the duct has a recess at the top thereof, the valve being pivoted in this recess, and an arcuate recess at the bottom curved on an arc centered in the axis of the pivot for the valve, the lower end of the valve extending into said bottom recess.

17. A high-speed ground transportation system comprising a duct, a vehicle adapted for propulsion through the duct, said duct having an entrance valve and an exit valve adapted when closed to block off a section of the duct from valve to valve, said section being evacuated prior to entry of the vehicle therein, the duct having a first terminal portion outward of the entrance valve and a second terminal portion outward of the exit valve both in communication with the earth's atmosphere, the vehicle being adapted for propulsion by the force of atmospheric air pressure thereon from said first terminal portion into said section on opening said entrance valve and for displacement of atmospheric air on opening of the exit valve and travel of the vehicle past said exit valve into said second terminal portion, whereby energy is put into the vehicle by the earth's atmosphere on entrance into said section of the duct and transferred back to the earth's atmosphere on passage of the vehicle into said second terminal portion.

18. The method of operating a high-speed ground transportation system in which a vehicle is propelled through a duct, the duct having an entrance valve and an exit valve adapted when closed to block off a section of the duct from valve to valve, and a first terminal portion outward of the entrance valve and a second terminal portion outward of the exit valve both open to the earth's atmosphere, comprising starting with the vehicle in the first terminal portion, both valves closed and said section evacuated, opening the entrance valve for propulsion of the vehicle into said section past said entrance valve, closing said entrance valve after the vehicle has passed thereby, effecting travel of said vehicle through said section, and opening said exit valve for passage of the vehicle into said second terminal portion, the vehicle displacing atmospheric air for energy transfer back to the atmosphere.

19. A high-speed ground transportation system comprising a duct, a vehicle adapted for propulsion through the duct, said duct having a valve adjacent one end thereof, said valve, when closed, blocking off a section of the duct on that side of the valve away from said end of the duct, said section being evacuated, said duct having a terminal portion on the other side of the valve adapted for communication with the earth's atmosphere, the vehicle being adapted for propulsion in said terminal portion as a piston by differential pressure of air on the ends of the vehicle and being adapted to occupy a position in said terminal portion with a space between the valve and the end of the vehicle toward the valve, an air by-pass around the valve for interconnection of said section and said space, and a by-pass valve in said by-pass adapted to be set for evacuation of said space into said section.

20. A high-speed ground transportation system as set forth in claim 19 wherein said valve has an inlet for air from the earth's atmosphere and is further adapted to be set to supply air from the earth's atmosphere to said space while blocking the interconnection between said section and said space.

References Cited

UNITED STATES PATENTS

| | | | |
|---|---|---|---|
| 268,715 | 12/1882 | Needham | 243—19 |
| 1,813,625 | 7/1931 | Knox | 104—155 |
| 2,296,771 | 9/1942 | Crawford et al. | 104—138 |
| 3,090,328 | 5/1963 | Berggren | 104—138 |
| 3,104,078 | 9/1963 | Buchwald et al. | 243—19 |

DRAYTON E. HOFFMAN, *Primary Examiner.*

U.S. Cl. X.R.

104—138, 139, 155; 243—1